(12) United States Patent
Kohlbrenner et al.

(10) Patent No.: US 12,024,233 B2
(45) Date of Patent: Jul. 2, 2024

(54) STRUCTURAL COMPONENT

(71) Applicant: GF Casting Solutions AG, Schaffhausen (CH)

(72) Inventors: Fabian Kohlbrenner, Hoechenschwand (DE); Stephan Philipp, Gailingen (DE)

(73) Assignee: GF CASTING SOLUTIONS AG, Schaffhausen (CH)

( * ) Notice: Subject to any disclaimer, the term of this patent is extended or adjusted under 35 U.S.C. 154(b) by 87 days.

(21) Appl. No.: 17/745,902

(22) Filed: May 17, 2022

(65) Prior Publication Data

US 2022/0371664 A1 Nov. 24, 2022

(30) Foreign Application Priority Data

May 19, 2021 (EP) .................................. 21 174 562

(51) Int. Cl.
| | | |
|---|---|---|
| *B62D 25/08* | (2006.01) | |
| *B62D 25/04* | (2006.01) | |
| *B62D 25/14* | (2006.01) | |
| *B62D 25/20* | (2006.01) | |
| *B62D 29/00* | (2006.01) | |
| *C22F 1/04* | (2006.01) | |
| *C22F 1/06* | (2006.01) | |

(52) U.S. Cl.
CPC ......... *B62D 25/2045* (2013.01); *B62D 25/04* (2013.01); *B62D 25/08* (2013.01); *B62D 25/081* (2013.01); *B62D 25/145* (2013.01); *B62D 29/008* (2013.01); *C22F 1/04* (2013.01); *C22F 1/06* (2013.01)

(58) Field of Classification Search
CPC .. B62D 25/145; B62D 25/2045; B62D 25/08; B62D 25/04; B62D 25/14; B62D 29/008
USPC .......... 296/39.1, 70, 193.04, 193.05, 193.09, 296/203.01, 203.02, 900
See application file for complete search history.

(56) References Cited

U.S. PATENT DOCUMENTS

2015/0001884 A1  1/2015  Saje

FOREIGN PATENT DOCUMENTS

| DE | 19538733 A1 * | 5/1996 | ........... B62D 25/082 |
| DE | 102008062004 A1 | 6/2010 | |
| DE | 102008062007 A1 | 6/2010 | |
| DE | 102009006960 A1 * | 8/2010 | ........... B62D 25/145 |
| EP | 0836983 A2 | 4/1998 | |
| EP | 1073579 B1 * | 6/2002 | ............. B62D 25/08 |

(Continued)

OTHER PUBLICATIONS

Translation of Gregorie (Year: 1936).*

(Continued)

*Primary Examiner* — Dennis H Pedder
(74) *Attorney, Agent, or Firm* — LEYDIG. VOIT & MAYER, LTD.

(57) ABSTRACT

A structural component for a motor vehicle is configured to extend transversely to a direction of travel for the motor vehicle and is configured to separate a passenger compartment and a front compartment of the motor vehicle. The structural component includes: a dashboard; two A-pillars arranged in each case laterally with respect to the dashboard; and a transverse reinforcement running along an upper side of the dashboard. The structural component is one-part or a one-piece light-metal die casting.

16 Claims, 4 Drawing Sheets

(56) References Cited

FOREIGN PATENT DOCUMENTS

EP          1352813 B1 * 11/2004   ........... B62D 25/147
GB           459491 A  *  8/1936

OTHER PUBLICATIONS

Translation of Meinert et al (Year: 2010).*
Translation of Adam Opel (Year: 2013).*
Translation of Wolf.2015 (Year: 2015).*

* cited by examiner

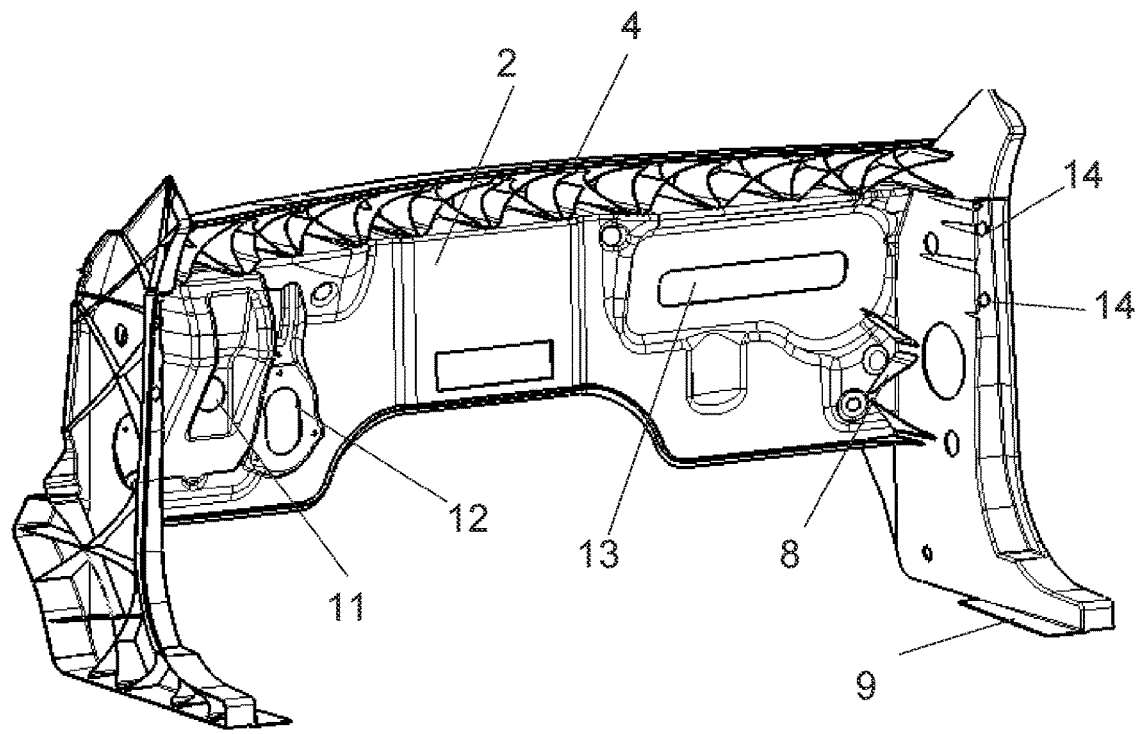
Fig. 2
Fig. 3
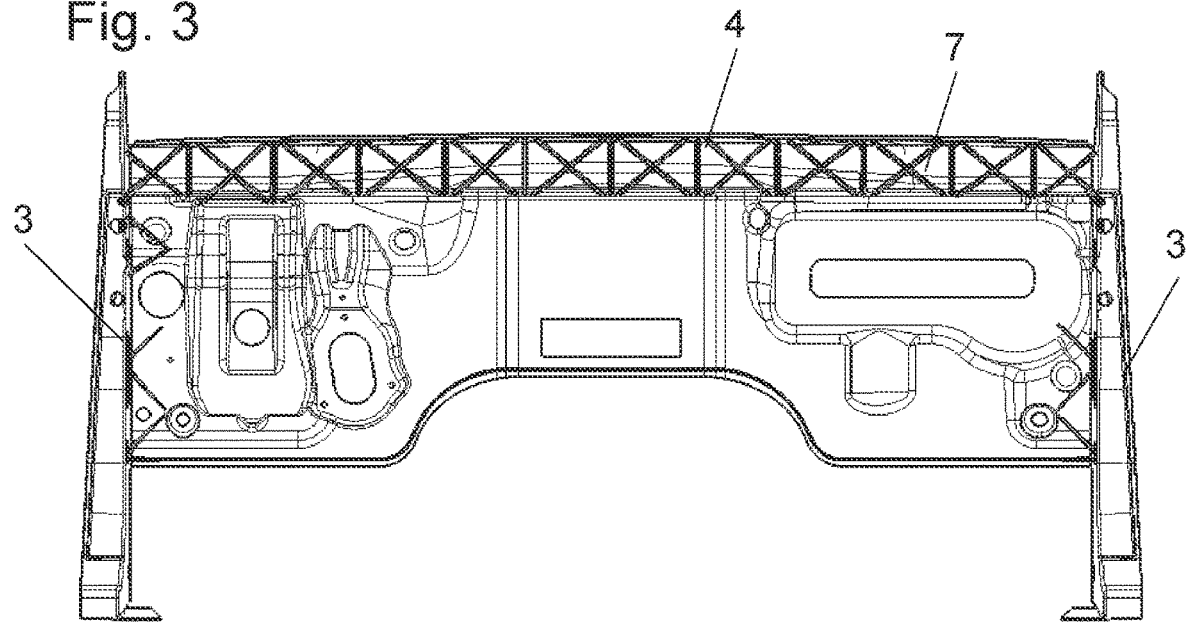

STRUCTURAL COMPONENT

CROSS-REFERENCE TO PRIOR APPLICATIONS

This application claims benefit to European Patent Application No. EP 21 174 562.5, filed on May 19, 2021, which is hereby incorporated by reference herein.

FIELD

The invention relates to a structural component of a motor vehicle and to a method for producing the same.

BACKGROUND

DE 10 2008 062 007 A1 discloses a bulkhead, which is of multi-part design, namely comprising a lower crossmember, a bulkhead element and an upper reinforcing member, wherein the lower crossmember is designed as a light-metal die-cast component, and the bulkhead element and also the upper reinforcing member are formed from a light-metal sheet. The elements are connected to one another, e.g. by welding, screwing, adhesive bonding or clinching.

The disadvantage here is the high outlay for connecting the individual parts to one another.

DE 10 2008 062 004 A1 discloses a body structure in which the bulkhead has a flange and is connected to the crossmember, which likewise has a flange. In this case, the bulkhead is formed from a light-metal sheet and is preferably welded or adhesively bonded to the crossmember. Here too, there is the disadvantage of the high expenditure of time in bringing the individual elements together before the structural body part can be installed in the vehicle body.

SUMMARY

In an embodiment, the present invention provides a structural component for a motor vehicle that is configured to extend transversely to a direction of travel for the motor vehicle and is configured to separate a passenger compartment and a front compartment of the motor vehicle. The structural component includes: a bulkhead; two A-pillars arranged in each case laterally with respect to the bulkhead; and a transverse reinforcement running along an upper side of the bulkhead. The structural component is one-part or a one-piece light-metal die casting.

BRIEF DESCRIPTION OF TE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2 shows a three-dimensional view of a structural component according to the invention when viewed from the passenger compartment;

FIG. 3 shows a plan view of a structural component according to the invention when viewed from the passenger compartment;

DETAILED DESCRIPTION

Figure 1:
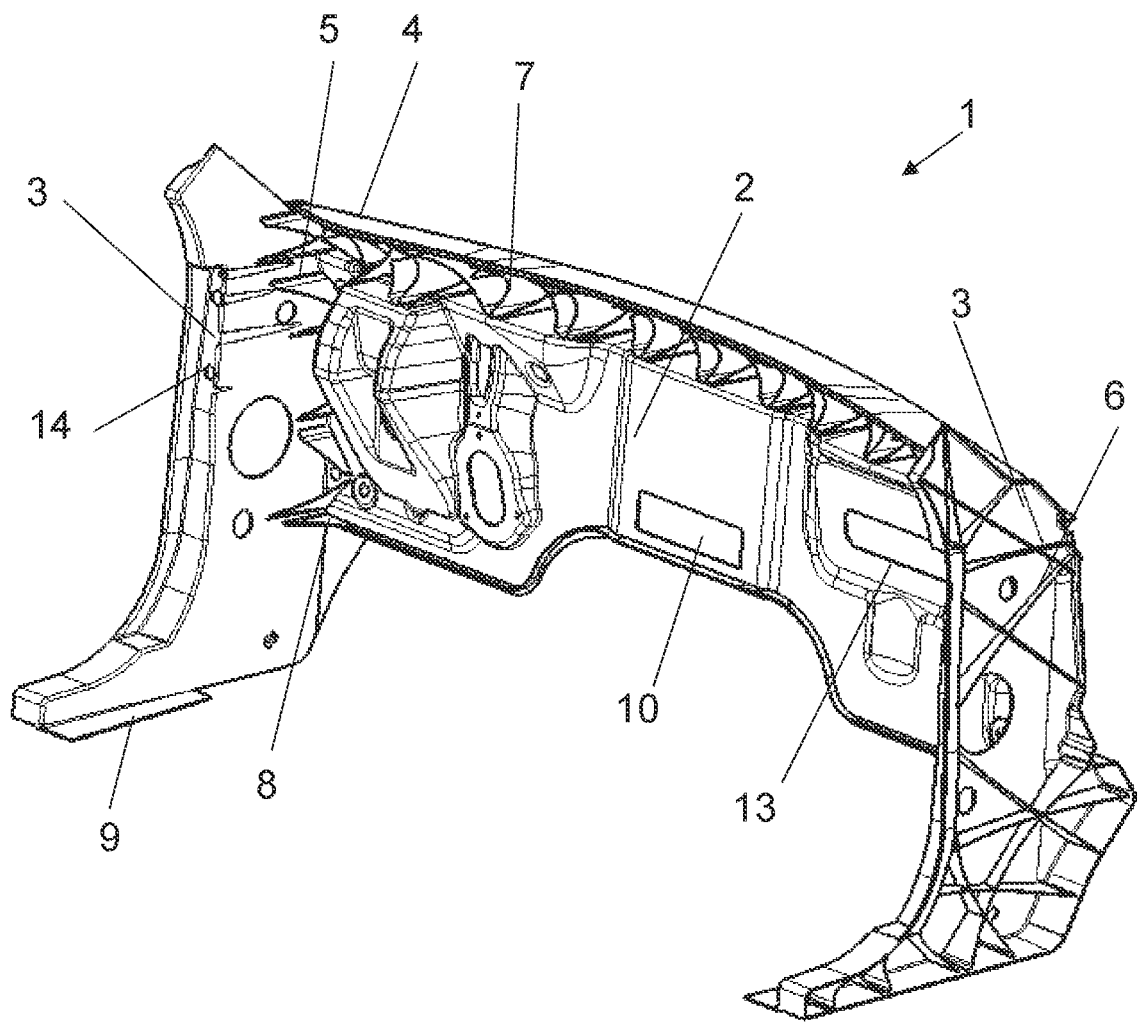
FIG. 1 shows a three-dimensional view of a structural component according to an embodiment of the invention when viewed from the passenger compartment.
Figure 4:
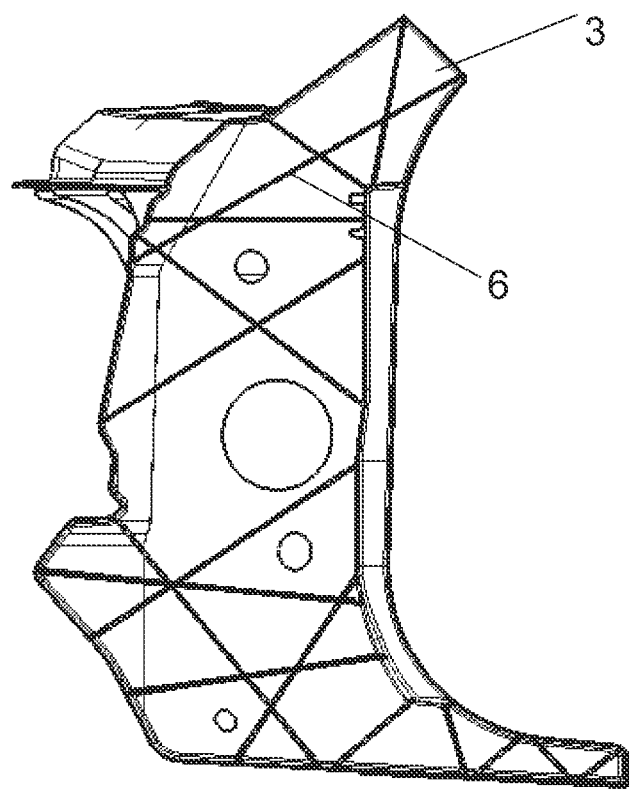
FIG. 4 shows a side view of an A-pillar.
Figure 5:
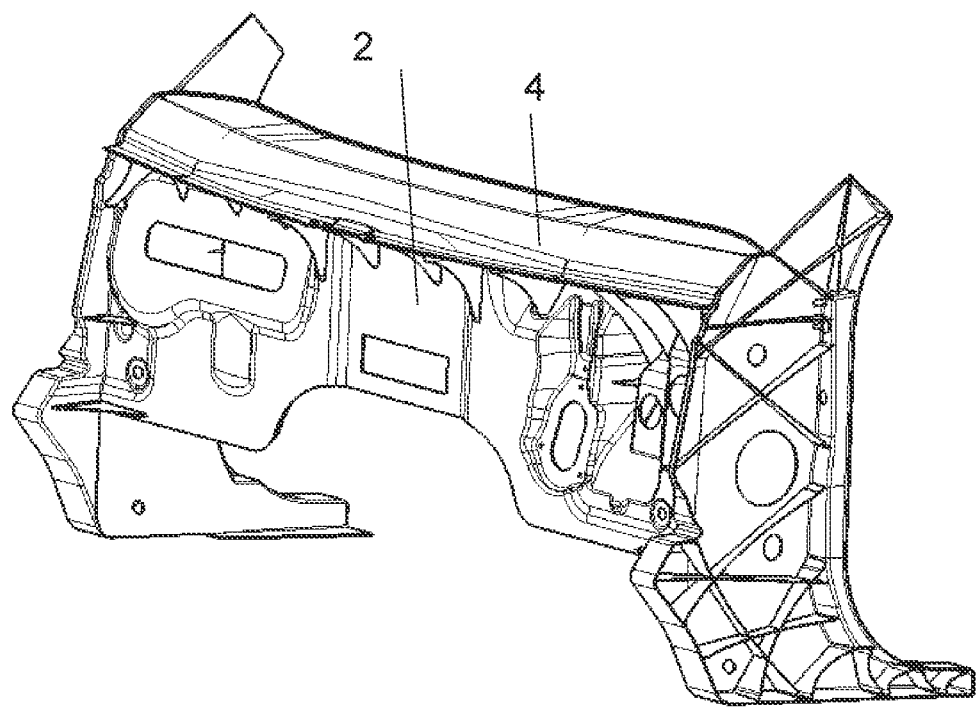
FIG. 5 shows a three-dimensional view of a structural component according to the invention when viewed from the front compartment.
Figure 6:
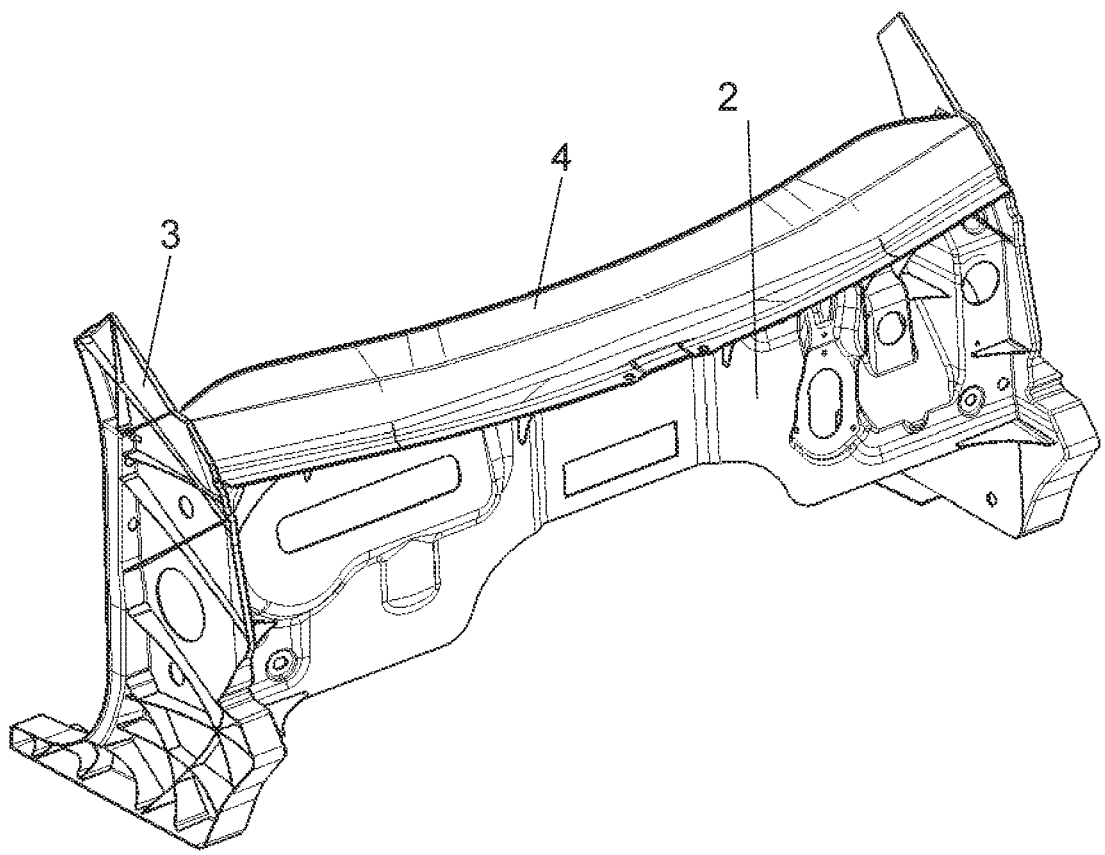
FIG. 6 shows a three-dimensional view of a structural component according to the invention when viewed from the front compartment.

Embodiments of the present invention provide a structural component and a method associated therewith which shortens the production time, reduces logistics expenses and requires as few manual working steps as possible, the intention being thereby to increase the economic efficiency of the component, and also that the structural component have as low a weight as possible.

The structural component, according to an embodiment of the invention, is of a motor vehicle, wherein the structural component extends transversely to the direction of the vehicle and serves to separate the passenger compartment and the front compartment, preferably the engine compartment, and comprises a bulkhead, two A-pillars arranged in each case laterally with respect to the bulkhead, and a transverse reinforcement running along the upper side of the bulkhead. The structural component according to an embodiment of the invention is of one-part or one-piece design, that is to say the elements, such as the bulkhead, the A-pillars and also the transverse reinforcement, do not require any joining processes in order to be connected to one another, but rather the structural component according to an embodiment of the invention is of integral design. Moreover, the structural component according to an embodiment of the invention is designed as a light-metal die casting, allowing a thin-walled structure and nevertheless achieving the desired stability.

It has been found to be advantageous if the bulkhead has a pedal carrier arranged integrally thereon. Integrally arranged thereon is understood to mean that a pedal carrier is integrated directly into the bulkhead or into the structural component and is likewise arranged on the die-cast component according to an embodiment of the invention. Thus, the structural component according to an embodiment of the invention with an integrated pedal carrier is of one-part or one-piece design.

Of course, further or other tabs and holders can also be arranged integrally on the structural component according to an embodiment of the invention, as required, or further and other tabs and holders can also be integrated into the light-metal die-cast component, depending on the type of vehicle.

The structural component is preferably of thin-walled design, wherein the component wall is between 1 and 8 mm, preferably between 2 and 5 mm. The component walls preferably have different thicknesses corresponding to their positioning on the structural component. By virtue of the different thicknesses of the component walls, flow behaviour in the structural component is optimized or optimization of filling is achieved. On the one hand, the individual component walls can have different thicknesses, corresponding to their arrangement, and, on the other hand, a component wall itself can also have different thicknesses, that is to say it can taper or widen in order to achieve optimization of filling, as mentioned above.

It has been found to be a preferred embodiment if the A-pillar has ribbing for the reinforcement thereof. The ribbing is preferably arranged on one side of an A-pillar and extends over the entire width and height, or only over a partial region.

It has been found to be advantageous if the transverse reinforcement has ribbing for reinforcement. The ribbing is preferably arranged between the bulkhead and the transverse reinforcement. In this case, the ribbing is preferably formed by a regular arrangement of ribs along the upper side of the bulkhead.

Ribbing is preferably arranged in the transitional region between the bulkhead and the A-pillar. This arrangement of the ribbing increases the rigidity between the individual components of the structural component.

According to a preferred embodiment, the structural component according to the invention is produced from an aluminum (Al) or magnesium (Mg) alloy.

According to an embodiment of the invention, the structural component is produced by die casting.

Producing the structural component according an embodiment to the invention by die casting makes possible complex, thin-walled and yet stable shaping. Moreover, various add-on parts can be integrated directly into the one-part structural component, thereby avoiding additional assembly steps.

It has been found to be advantageous if the structural component according to an embodiment the invention is subjected to heat treatment after casting. The desired properties, such as, for example, the strength of the structural component, are thereby further enhanced. Heat treatment can be carried out in whole or in part.

All design options can be freely combined with one another.

Exemplary embodiments of the invention are described with reference to the figures, although the invention is not limited to the exemplary embodiments.

The drawing presented in FIG. 1 shows a structural component 1 according to an embodiment of the invention for a motor vehicle. In the installed state, the structural component extends transversely to the vehicle arrangement and separates the passenger compartment and the front compartment, preferably the engine compartment, from one another. The structural component 1 includes a bulkhead 2 and A-pillars 3, each formed laterally thereon. The two mutually opposite A-pillars 3 are preferably of mirrored design. Moreover, the structural component 1 according to an embodiment of the invention includes a transverse reinforcement 4, which runs along the upper side of the bulkhead 2. The structural component 1 according to an embodiment of the invention, with the elements included, the A-pillars 3, the bulkhead 2 and the transverse reinforcement 4, is of one-part or one-piece design. Thus, it does not have any joints or connecting elements. The structural component 1 according to an embodiment of the invention is designed as a light-metal die casting and can thus be produced in a single working step. By virtue of the design as a die-cast component, a thin-walled structure is possible which, by virtue of possible ribbing, forms the required stability. As can be seen in the figures, it is advantageous if a pedal carrier 4 is likewise integrated directly on the structural component 1 or if this element too is integrally formed on the bulkhead 2, thereby making it possible to avoid an additional joining process.

It can be clearly seen in the figures that it is advantageous if the A-pillar 3 has ribbing 6, which increases stability. The ribbing 6 in the A-pillar 3 preferably runs on the outside. Moreover, it is preferable if it is arranged at regular intervals.

It can likewise be seen from the figures that it is advantageous if ribbing 7 is arranged between the transverse reinforcement 4 and the upper side of the bulkhead 2. This increases the stability of the transverse reinforcement 4. Furthermore, the structural component 1 according to an embodiment of the invention preferably has ribbing 8 between the bulkhead 2 and the respective A-pillar 3.

Moreover, the structural component 1 according to an embodiment of the invention preferably has a connection 9 to the sill at the A-pillars 3.

Furthermore, it is advantageous if the bulkhead 2 has an integrated passage 10 for piping of an air conditioning unit. It has been found to be a further advantage if there is also a passage 11, 12 for the plunger of the brake pedal and/or of the steering rod directly into the bulkhead 2. It is likewise advantageous if a service opening 13 for the air conditioning unit is integrated into the bulkhead 2. It is also advantageous if connection points for a cockpit crossmember and/or roof rails are integrated onto the A-pillar 3.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Structural component
2 Bulkhead
3 A-pillar
4 Transverse reinforcement
5 Pedal carrier
6 A-pillar ribbing
7 Transverse reinforcement ribbing
8 A-pillar/bulkhead ribbing
9 Sill connection
10 Air conditioning passage
11 Brake pedal plunger passage
12 Steering rod passage
13 Service opening for air conditioning un
14 Connection points

The invention claimed is:

1. A structural component for a motor vehicle, the structural component being configured to extend transversely to a direction of travel for the motor vehicle and being configured to separate a passenger compartment and a front compartment of the motor vehicle, the structural component comprising:
   a bulkhead;
   two A-pillars arranged in each case laterally with respect to the bulkhead; and
   a transverse reinforcement running along an upper side of the bulkhead,
   wherein the structural component is a one-piece light-metal die casting.

2. The structural component according to claim 1, wherein the bulkhead comprises an integrated pedal carrier.

3. The structural component according to claim 1, wherein the structural component is of thin-walled design, wherein a wall of the structural component is between 1 and 8 mm thick.

4. The structural component according to claim 1, wherein the A-pillar has ribbing for the reinforcement thereof.

5. The structural component according to claim 1, wherein the transverse reinforcement has ribbing for reinforcement.

6. The structural component according to claim 1, wherein ribbing is arranged in a transitional region between the bulkhead and the A-pillar.

7. The structural component according to claim 1, wherein the structural component is produced from an aluminum (Al) or magnesium (Mg) alloy.

8. A method for producing a structural component for a motor vehicle, the structural component being configured to extend transversely to a direction of travel for the motor vehicle and being configured to separate a passenger compartment and a front compartment of the motor vehicle, the method comprising:
   forming the structural component as one part or producing the structural component by a once piece die casting,
   wherein the structural component comprises:
      a bulkhead;
      two A-pillars arranged in each case laterally with respect to the bulkhead; and
      a transverse reinforcement running along an upper side of the bulkhead.

9. The method according to claim 8, wherein the structural component is subjected to heat treatment after casting.

10. The method according to claim 8, wherein the structural component is between 1 and 8 mm thick.

11. The method according to claim 8, wherein ribbing is formed in a transitional region between the bulkhead and the A-pillar.

12. The method according to claim 8, wherein the structural component is produced from an aluminum (Al) or magnesium (Mg) alloy.

13. The structural component according to claim 1, wherein the front compartment is the engine compartment.

14. The structural component according to claim 2, wherein the wall of the structural component is between 2 and 5 mm thick.

15. The method for producing the structural component according to claim 1, wherein the forming of the structural component does not comprise a joining process to connect the bulkhead, the two A-pillars, and the transverse reinforcement together.

16. The structural component according to claim 1, wherein the bulkhead, the A-pillars, and transverse reinforcement comprise components walls, the component walls having non-identical thicknesses.

* * * * *